United States Patent [19]
Manabe et al.

[11] 3,906,356
[45] Sept. 16, 1975

[54] APPARATUS USING SOLENOID COILS FOR DETECTING RECTILINEAR MOVEMENT

[75] Inventors: Takao Manabe; Satosi Kumamoto, both of Numazu, Japan

[73] Assignee: Toshiba Kikai Kabushiki Kaisha, Tokyo, Japan

[22] Filed: June 7, 1974

[21] Appl. No.: 477,429

[30] Foreign Application Priority Data
June 12, 1973 Japan.................................. 48-66161

[52] U.S. Cl. ............................... 324/34 D; 340/196
[51] Int. Cl.² .......................................... G01R 33/00
[58] Field of Search ............ 324/34 R, 34 D, 34 PS; 340/195, 196

[56] References Cited
UNITED STATES PATENTS
2,769,969 11/1956 Comstock ......................... 324/34 R
3,444,542 5/1969 Kimura ............................... 340/196

FOREIGN PATENTS OR APPLICATIONS
814,617 6/1959 United Kingdom ............. 324/34 PS
954,893 4/1964 United Kingdom................. 340/196

*Primary Examiner*—Robert J. Corcoran
*Attorney, Agent, or Firm*—Spensley, Horn & Lubitz

[57] ABSTRACT

In apparatus for detecting rectilinear movement of the type comprising a screw made of magnetic material and provided with a single screw thread and a detection coil including a bobbin slidably containing the screw and provided with double screw threads having a pitch of one half of the pitch of the single screw thread, a pair of solenoid coils wound in the valleys of the double screw threads, and lead conductors connected to the opposite ends of the solenoid coils the lead conductors of one solenoid coil being 180° apart from the lead conductors of the other solenoid coil, whereby the difference in the inductances of the pair of solenoid coils is detected for measuring the relative rectilinear movement between the screw and the detection coil, the inductances of the opposite ends of the solenoid coils are made smaller than the inductances of the intermediate portions.

3 Claims, 17 Drawing Figures

FIG. 1
PRIOR ART
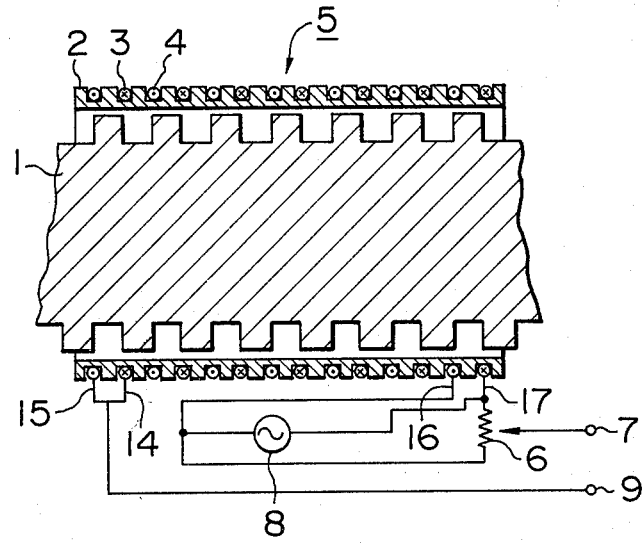
FIG. 2a
PRIOR ART
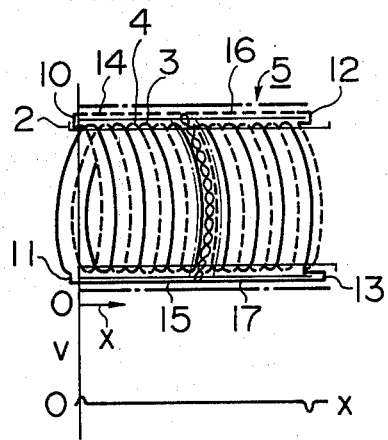
FIG. 2b
PRIOR ART
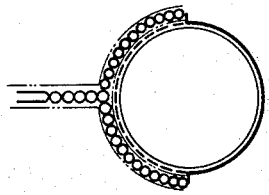
FIG. 2c
PRIOR ART

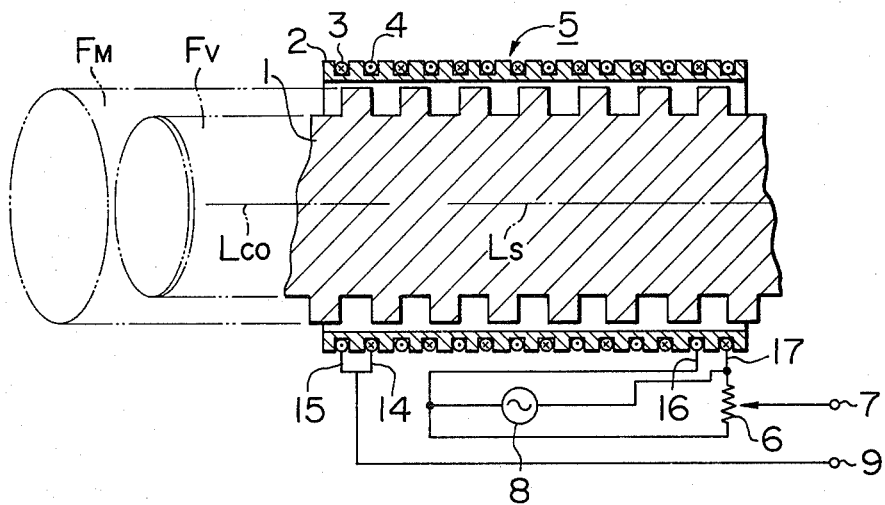
FIG. 3 PRIOR ART
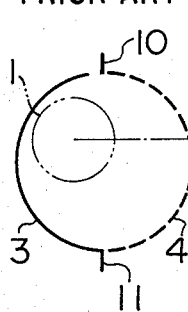
FIG. 4a
PRIOR ART
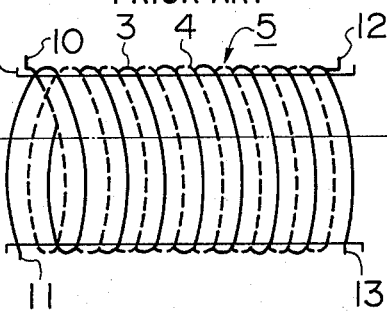
FIG. 4b
PRIOR ART
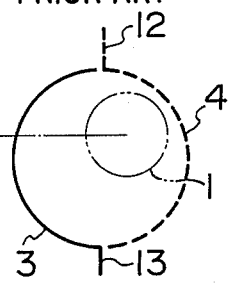
FIG. 4c
PRIOR ART
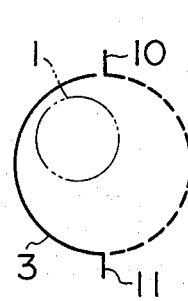
FIG. 5a
PRIOR ART
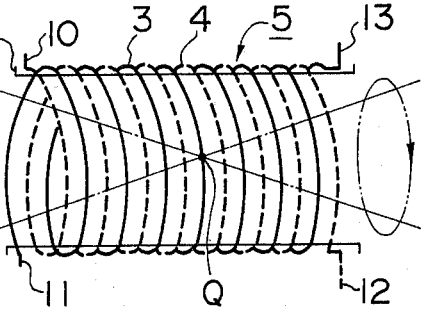
FIG. 5b
PRIOR ART
FIG. 5c
PRIOR ART

APPARATUS USING SOLENOID COILS FOR DETECTING RETILINEAR MOVEMENT

BACKGROUND OF THE INVENTION

This invention relates to apparatus for detecting rectilinear i.e. a small straight line movement or displacement and more particularly to improvements of apparatus for detecting rectilinear movement disclosed in Japanese patent publication No. 18630 of 1970 which is useful in positioning the tools or other elements of machine tools or the like at correct positions.

As diagrammatically shown in FIG. 1 of the accompanying drawing, the detecting apparatus disclosed in said patent publication comprises a magnetic screw 1 acting as a reference scale of the detecting apparatus, and a bobbin 2 which receives the screw and can be moved relative to the screw in the axial direction thereof. Although not shown in the drawing, the opposite ends of the screw are supported by supporting means such that after being rotated a desired angle, the screw is firmly held in the adjusted position. In the example shown, the screw is provided with a single screw thread having a pitch of Pmm, whereas the periphery of the bobbin 2 is formed with double screw threads having a pitch of ½Pmm and a lead of Pmm. Two independent conductors are received in the valleys of the screw threads to form solenoid coils 3 and 4. Since coils 3 and 4 and bobbin 2 are constructed to be integral, for the sake of simplicity, the assembly will be termed hereinafter a detection coil 5. The opposite ends of the coils 3 and 4 are connected to form a bridge circuit by means of conductors 14 through 17 together with a potentiometer resistor 6. The bridge circuit is excited by a source of alternating current 8 and produces an output across terminal 7 connected to the movable arm of potentiometer resistor 6 and terminal 9 connected to the juncture between lead conductors 14 and 15. By rectifying the bridge output by means of a synchronous rectifier, not shown, it is possible to obtain a DC output having a magnitude depending upon the relative displacement between the crest of screw 1 and the coils 3 and 4 and a polarity depending upon the direction of displacement. Accordingly, it is possible to use the apparatus for detecting the relative rectilinear displacement between the screw and the detection coil.

Errors of such apparatus are caused by the following factors:
1. Errors in the configuration of screw 1, mainly the error in the adjacent pitches and the accumulated pitch error,
2. Variation in the sensitivity of coils 3 and 4 at respective positions,
3. Mode of deriving out lead conductors 14 through 17, and
4. The abnormal sensitivity caused by the positions of lead conductors 14 through 17.

According to the invention described in said patent publication an improved detector was provided in which these errors have been eliminated and a positioning accuracy of ± 2 to 3 microns was obtained.

In order to further improve the accuracy, other causes of errors than those listed above must be solved.

FIGS. 2a, 2b and 2c correspond to FIGS. 4a, 4b and 4c respectively of the patent publication and are helpful to explain these causes. In FIG. 2a, 10 and 12 show upper lead conductors for coil 4 and 11, and 13 lower lead conductors for coil 3. With reference to FIGS. 2a, 2b and 2c, how the causes 1 to 4 have been solved will be described hereunder.

The pitch error of cause 1 has been solved by carefully machining the screw at a considerably high accuracy whereas the accumulated pitch error has been solved by dividing the screw into a plurality of sections, each having a length of 100 mm for example, and by connecting together the sections with a phase difference so that the pitch error will not accumulate over a length of more than 100 mm. To this end, split sections were made hollow to receive a supporting shaft, and the length of the detection coil was made $n$ times (where $n$ represents an integer) of the length of a split section. This construction can also eliminate the error between adjacent pitches because the output of the detection coil is averaged to provide a definite value. The causes 3 and 4 have been eliminated by providing lead conductors for both ends of coils 3 and 4 at positions 180° spaced apart and by twisting together pairs of lead conductors 14, 16; and 15, 17. The twisted pairs are caused to surround 90° of the periphery of the detection coil 5 and are then to extend radially outwardly as shown in FIG. 2b.

With regard to the cause 4, the sensitivity is different at the opposite ends of the detection coil as shown in FIG. 2c. Although such difference in the sensitivity affects precise positioning, since it has been possible to position with an error of ±2 to 3 microns, the effect of the difference in the sensitivity is not serious.

The cause 2 will be considered in more detail with reference to FIG. 3. While the screw 1 is being rotated, assume now that the axis $L_s$ of the screw 1 is in perfect axial alignment with the axis $L_{co}$ of the detection coil and that a surface $F_M$ or $F_1$ in contact with the crest or valley of the screw forms the surface of a cylinder about the axis $L_s$ or $L_{co}$, then the positioning error caused by the cause 2 will not appear. Actually, however, the axes $L_s$ and $L_{co}$ are not always in perfect axial alignment and contact surfaces $F_m$ and $F_o$ are not always portions of a cylindrical surface. However, such conditions can be considered to be equivalent to the conditions involving an eccentricity and gyration of the screw 1.

FIG. 4b shows a condition in which the axis $L_s$ is made to be eccentric with respect to the axis $L_{co}$ of the detection coil 5.

Under these conditions, the start and end points of coils 3 and 4 shown in FIG. 2a (the points at which the lead conductors are connected) are in phase. That is, the coil 3 is provided with lead conductors 11 and 13 at its left lower and right lower portions whereas the coil 4 is provided with the lead conductors 10 and 12 connected to the left upper and right upper portions.

The coupling between the screw and the coil 3 is strengthened at the lefthand end (shown in FIG. 42) whereas the coupling between the screw and the coil 4 is strengthened at the righthand end so that these couplings cancell with each other and the bridge circuit will not be unbalanced. For this reason, it is possible to make the eccentricity of screw 1 in any direction and of any extent not to contribute to any error by positioning respective lead conductors 10, 11, 12 and 13 as shown in FIGS. 4a, 4b and 4c. A case wherein the gyration alone of the screw 1 presents will be considered with reference to FIGS. 5a, 5b and 5c. FIG. 5b shows a condition wherein the center of gyration of the screw is positioned at the center of the axis of detection coil 5, that is the axis $L_s$ of screw 1 rotates in the direction of an arrow. Different from the condition shown in FIG. 4b, the start point and end point of coils 3 and 4 are dephased 180° in circumferential direction. FIGS. 5a and 5c show left-and righthand end views of the detection coil 5, respectively, and correspond to FIGS. 4a and 4c. As can be noted from FIGS. 5a and 5c, at the lefthand end of the detection coil 5, the coupling between the screw 1 and the coil 3 is increased due to the gyrating motion of the screw. However, at the righthand end also as the coupling between screw 1 and coil 4 is increased, it is possible to eliminate the error due to gyration in the same manner as in the case of eccentricity shown in FIGS. 4a, 4b and 4c.

Although in the foregoing description, eccentricity and gyration were considered independently, and errors caused by these causes were eliminated independently by winding coils 3 and 4 and by providing lead conductors thereto as shown in FIGS. 4 and 5. According to present day method of journalling the screw 1, however, it is inevitable that the eccentricity and gyration coexist so that with the prior art methods of winding the coils and attaching the lead conductors, it is possible to eliminate the error caused by only one of them.

FIG. 6 shows the result of test conducted to confirm this consideration wherein the detection coil was moved L ($\theta$) so as to bring to zero the output of the synchronous rectifier when screw is rotated $\theta$ radians ($\theta \leq 2\pi$). Then the following equation holds:

$$L(\theta) = \frac{\theta}{2\pi} \cdot P + E(\theta) \quad (1)$$

Where there is no cause between screw 1 and detection coil 5 that results in an error, E ($\theta$) = O. Actually, however, there is an error E ($\theta$) having a period equal to the pitch P (= $2\pi$). The fact that the period of the error E ($\theta$) is equal to one revolution or $2\pi$ can be attributable to the eccentricity and gyration of the screw 1.

FIGS. 7a and 7b are diagrams to show an experiment which was conducted to prove this fact. As shown in FIG. 7a, five piano wire pieces 18, each having a length of ¼ of the peripheral length of a valley, were secured to the screw at one end of the detection coil 5. This arrangement is equivalent to a gyrating motion of the screw.

When the piano wire pieces are positioned at A or C, the error E ($\theta$) expressed by equation 1 is zero where it is supposed that the error is zero in the absence of any piano wire piece. On the other hand, where the piano wire pieces are mounted on positions B or D, the error is maximum, amounting to five to six times of $E_{max}(\theta)$ shown in FIG. 6. However, at positions B or D the output of the synchronous rectifier is identified as positive or negative. In this manner, the eccentricity and gyration were imparted equivalently to the screw by the piano wire pieces for the purpose of amplifying the phenomena that cause errors for ready observation.

FIG. 8 is a diagram showing the flux distribution of the detection coil 5 in a plane intersecting at right angles respective coils 3 and 4. As shown, the magnetic fluxes $g_3$ and $g_4$ at both ends of the coil have longer paths than those at the intermediate portions. This means that the fluxes $g_3$ and $g_4$ have longer paths in the screw 1 than those at the intermediate portion, for example $g_5$. Consequently, the inductance of the portions of the detection coil that create fluxes having longer paths in the screw made of magnetic material, that is the opposite ends of the coil 5 will be longer than those at the intermediate portion. For this reason, even when the detection coil 5 is wound and provided with lead conductors as disclosed in the patent publication, due to the difference in the inductances between the ends and intermediate portion, and due to the eccentricity and gyration, it has been impossible to limit the error to be less than ±2 microns.

From the foregoing discussion, it is concluded as follows.

1. The problems regarding eccentric and gyrating motions of the screw soly depend upon the accuracies of machining and mounting of the screw and the detection coil.
2. If either one of the eccentric and gyrating motions present, the error caused thereby can be avoided by winding the coils 3 and 4 and positioning their lead conductors as shown in FIGS. 4a 4b, 4d or 5a, 5b and 5c. However, as these motions coexist these measures can not decrease the error beyond a limit (±2 microns), 3. The inductance per unit axial length at both ends of the detection coil 5 is larger than that at intermediate portions. Moreover, this fact is not related directly to the presence or absence of the eccentric and gyrating motions of the screw. This large inductance of the coil at both ends thereof cooperates with the coexistence of the eccentric and gyrating motions thereby increasing the error.

SUMMARY OF THE INVENTION

Accordingly, it is an object of this invention to provide an improved rectilinear movement detection apparatus having an improved accuracy.

Another object of this invention is to provide an improved apparatus of the type described above which can reduce measurement errors caused by the eccentricity and gyrating motion of the screw relative to the detection coil.

According to the invention, there is provided apparatus for detecting rectilinear movement of the type comprising a screw made of magnetic material and provided with a single screw thread of a predetermined pitch, and a detection coil including a bobbin slidably containing the screw and provided with double screw threads formed on its outer surface and having a pitch of one half of the predetermined pitch, a pair of solenoid coils wound in alternate valleys of the double screw threads, and lead conductors connected to the opposite ends of the solenoid coils the lead conductors of one solenoid coil being 180° apart from the lead conductors of the other solenoid coil, whereby the difference in the inductances of the pair of solenoid coils is detected for measuring the relative rectilinear movement between the screw and the detection coil, characterized in that the inductances of the opposite ends of the solenoid coils are made smaller than the inductances of the intermediate portions of the solenoide coils.

Such reduction in the inductance can be accomplished by constituting the detection coil with a plurality of groups of solenoid coils with one ends of one group consisting of an even number of coils extended to one side of the detection coil, the other ends of the coils of said one group terminated a short distance from the other side of the detection coil, corresponding one ends of the other group consisting of an even number of coils interleaving with the coils of said one group terminated a short distance from said one side of the detection coil and the other ends of the coils of said other group extended to the other side of the detection coil.

BRIEF DESCRIPTION OF THE DRAWINGS

The invention can be more fully understood from the following detailed description taken in conjunction with the accompanying drawings in which:

FIG. 1 shows a diagrammatic sectional view of a prior art apparatus for detecting rectilinear movements;

FIG. 2a is a diagrammatic representation of a portion of a prior art detection coil;

FIG. 2b shows a righthand end view of the detection coil shown in FIG. 2a;

FIG. 2c shows a sensitivity curve of the detection coil shown in FIG. 2a;

FIG. 3 is a view similar to FIG. 1 useful to analyze a cause of the error;

FIG. 4b is a diagram showing an eccentric relation between the detection coil and the screw;

FIGS. 4a and 4c are lefthand and righthand end views of the assembly shown in FIG. 4b;

FIGS. 5a, 5b and 5c are views similar to FIGS. 4a, 4b and 4c, respectively, but showing the gyrating motion of the screw with respect to the detection coil;

DESCRIPTION OF THE PREFERRED EMBODIMENTS

Figure 9:
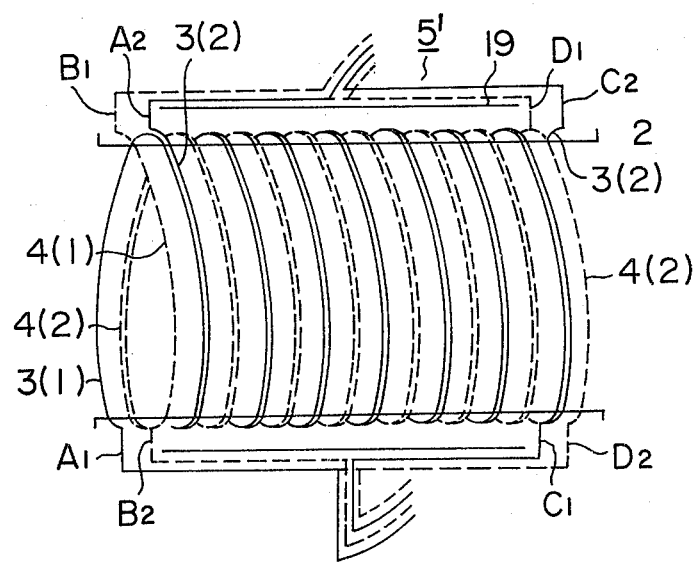
FIG. 9 is a diagrammatic perspective view of a novel apparatus of this invention for detecting rectilinear movement.
Figure 10:
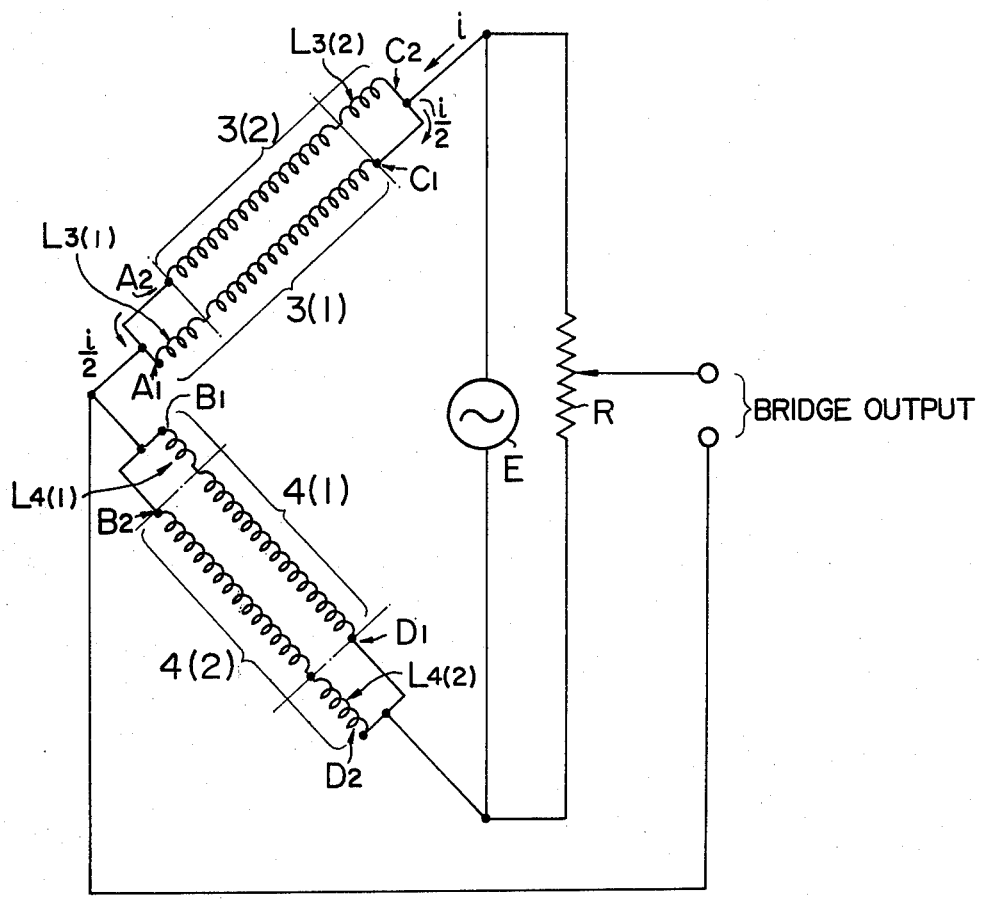
FIG. 10 shows a connection diagram of the detection apparatus shown in FIG. 9.

A preferred embodiment shown in FIG. 9 comprises a pair of solenoid coils, each consisting of two pairs of insulated conductors, that is a first solenoid coil group $G_3$ consisting of solenoid coils 3(1) and 3(2) and a second solenoid coil group $G_4$ consisting of solenoid coils 4(1) and 4(2). These solenoid coils are wound in the following manner. At the lefthand end of the detection coil 5', one end of the solenoid coil 3(1) is placed in a groove or valley of the screw threads formed on the bobbin 2, and after winding coil 3(1) for 180°, winding of the solenoid coil 3(2) in the adjacent groove is commenced. Thereafter, conductors of the coils 3(1) and 3(2) are wound simultaneously in two adjacent grooves. After winding a predetermined number of turns, a lead conductor $C_1$ is attached to the righthand end of the coil 3(1) at the same angular position or at a position 180° apart from the position at which the winding of the coil 3(1) was started. The solenoide coil 3(2) is wound further for one half turn and a lead conductor $C_2$ is attached to the righthand end of coil 3(2) at the same angular position or a position 180° apart from the position at which the winding of the coil 3(2) was started. The winding operation of the solenoid coil 4(1) in another groove is started from a position 180° apart from the position at which the winding of coil 3(1) was started. After winding coil 4(1) for the length of one half turn, the winding operation of the solenoid coil 4(2) is started and thereafter coils 4(1) and 4(2) are wound simultaneously. When the coils 4(1) and 4(2) are wound for the same number of turns as coils 3(1) and 3(2), lead conductors are attached to the righthand ends of the coils 4(1) and 4(2) at the same angular position or at 180° apart position in the same manner as has been described in connection with coils 3(1) and 3(2). Pairs of lead conductors $A_1$ and $B_2$, $A_2$ and $B_1$, $C_1$ and $D_2$, and $C_2$ and $D_1$ of the four coils are brought to the axial center of the detection coil over a magnetic shield 19 provided for the detection coil along diametrically opposite paths. At the center, one group pf lead conductors $A_1$, $B_2$, $C_1$ and $D_2$ is bent 90° and these four conductors are wound about the magnetic shield for 90° in the clockwise direction, for example, and the other group of four conductors $A_2$, $B_1$, $C_2$ and $D_1$ is wound for 90° in the opposite direction as diagrammatically shown in FIG. 9. At a point (not shown, but on the front side as viewed in FIG. 9) these eight conductors are grouped together and are bent radially outwardly in a manner as shown in FIG. 2b. Pairs of lead conductors $A_1$ and $A_2$, $B_1$ and $B_2$, $C_1$ and $C_2$, and $D_1$ and $D_2$ are connected together to form a bridge circuit as shown in FIG. 10 in which portions $L_3(1)$, $L_3(2)$, $L_4(1)$ and $L_4(2)$ correspond to respective half turns on both ends of the detection coil. As shown, pairs of coils 3(1) and 3(2) and 4(1) and 4(2) are connected in series across a potentiometer resistor R and a source of alternating current E, and the bridge output appears across the movable arm of the potentiometer resistor and the juncture between pairs of coils 3(1), 3(2) and 4(1), 4(2).

As can be noted from FIGS. 9 and 10, the magnitude of the current flowing through each half turn sections $L_3(1)$, $L_3(2)$, $L_4(1)$ and $L_4(2)$ is one half of that of the current flowing through one arm, or pairs of coils 3(1) and 3(2), and 4(1) and 4(2).

Accordingly, the inductance per unit axial length of each half turn section is smaller than that of said patent publication.

Figure 6:
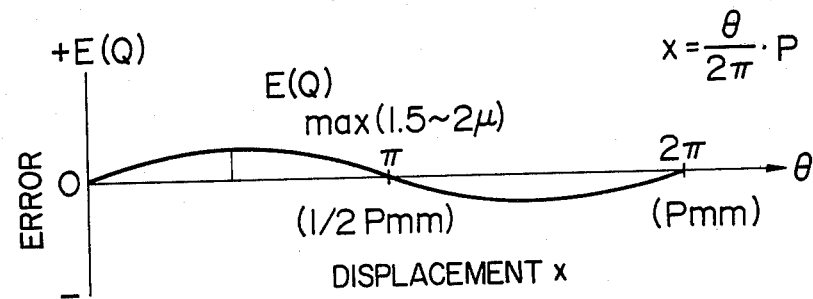
FIG. 6 is a graph showing the positioning error occurring in one pitch of the screw of the detecting apparatus utilizing the conventional detection coil.
Figure 7A:
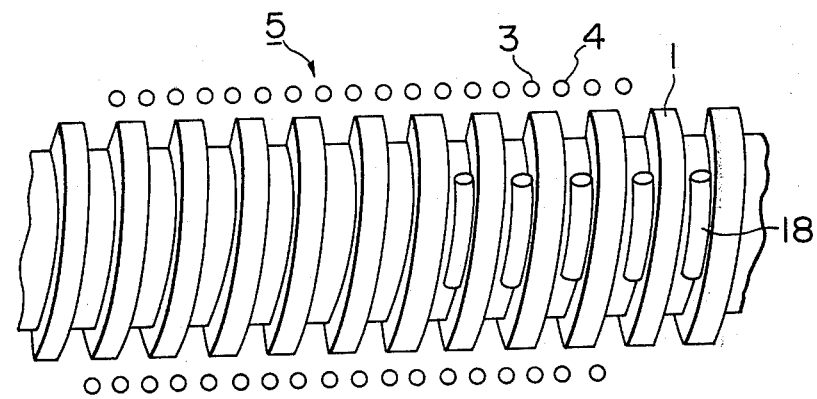
FIG. 7a is a diagrammatic representation of an experimental arrangement in which piano wire pieces are mounted on the screw for the purpose of creating gyrating motions.
Figure 7B:
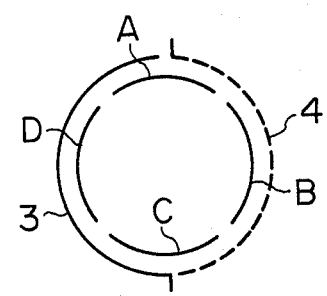
FIG. 7b is a diagrammatic sectional view showing the positions of mounting the piano wire pieces.
Figure 8:
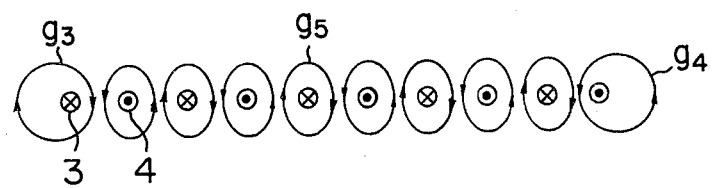
FIG. 8 shows a cross section of two coil conductors of the detection coil together with a distribution of magnetic fluxes around the conductors.

When the detection coil 5' shown in FIG. 9 was used to measure the positioning error $E(\theta)$ (see FIG. 2) the maximum value of the error was found to be less than ±0.5 micron. Moreover, the resulting error curve is not periodic as shown in FIG. 6 showing that the novel apparatus has a minimum error that can be practically attained.

In FIGS. 9 and 10 the opposite ends of the detection coil 5' are shown as comprising half turns on the ground that in the prior art construction the inductance at the opposite ends of the detection coil is twice or more of that of the intermediate portions, and that it is necessary to decrease the number of lead conductors thereby simplifying the construction. However, as it is essential for this invention to decrease the inductance at both ends of the detection coil, it will be clear that it is possible to use a number of modifications for decreasing the inductance at both ends, and that the inductance can be decreased to any desired extent. For example, solenoid coil group $G_3$ consisting of coils 3(1), 3(2), 3(3), 3(4) and solenoid coils group $G_4$ consisting of coils 4(1), 4(2), 4(3), 4(4) (coil 3(3), 3(4), 4(3) and 4(4) are not shown) may be wound side-by-side relationship in adjacent valleys for taking out lead conductors on both ends at a spacing of 90°. Alternatively, two groups each consisting of coils 3(1), 3(2), 3(3) and 4(1), 4(2) and 4(3) may be wound simultaneously in respective grooves with the ends of coils 3(2), 3(3), 4(2) and 4(3) terminated a short distance from the ends of the detection coil, whereas the ends of coils 3(1) and 4(1) extended to the ends of the detection coil. Generally speaking, this object can be accomplished by constituting the detection coil with a plurality of groups of solenoid coils with one ends of one group consisting of an even number of coils extended to one side of the detection coil, the other ends of the coils of said one group terminated a short distance from the other side of the detection coil, corresponding one ends of the other group consisting of an even number of coils interleaving with the coils of said one group terminated a short distance from said one side of the detection coil, and the other ends of the coils of said other group extended to said other side of the detection coil. However, it should be understood that, the coil ends are not necessarily be terminated at the same distance from the ends of the detection coil, and that they can be terminated at different distances.

Further, the numbers of coils of two groups are not required to be always equal. Thus, where these number of coils are not equal, the number of half turn coils is not equal on the opposite ends. This arrangement, however, merely causes a slight unbalance in the currents on the opposite sides. In other words, although it is essential to make smaller the inductance at the opposite ends of the detection coil than that at the intermediate portions, the decrease in the inductance may be different on both ends.

As described hereinabove, since the number of solenoid coils or the number of turns thereof is made to be smaller at the opposite ends than that at the intermediate portions, even when the screw of magnetic material and contained in the detection coil becomes eccentric or undergoes a gyrating motion with respect to the detection coil, it is possible to decrease the variation in the inductances of the solenoid coil groups $SOLG_3$ and $SOLG_4$ that constitute two arms of the bridge circuit whereby it is possible to greatly decrease the positioning error.

We claim:

1. In apparatus for detecting rectilinear movement of the type comprising a screw made of magnetic material and provided with a single screw thread of a predetermined pitch, and a detection coil, said detection coil including: (i) a bobbin slidably containing said screw and provided with double screw threads formed on its outer surface and having a pitch of one half of said predetermined pitch, (ii) a pair of solenoid coils wound in alternate valleys of said double screw threads, and (iii) lead conductors connected to the opposite ends of said solenoid coils, the lead conductors of one solenoid coil being 180° apart from the lead conductors at the other solenoid coil, whereby the difference in the inductances of said pair of solenoid coils is detected for measuring the relative rectilinear movement between said screw and said detection coil, the improvement wherein the inductances of the opposite ends of said solenoid coils are made smaller than the inductances of the intermediate portions of said solenoid coils.

2. The apparatus according to claim 1 wherein said detection coil is provided with first and second ends, each one of said solenoid coils comprises first and second coils electrically insulated from each other and connected in parallel, said first coil having ends, and said second coil having ends, one end of said first coil terminates a short distance from said first end of said detection coil, the other end of said first coil terminates at said second end of said detection coil, one end of said second coil terminates at said first end of said detection coil and the other end of said second coil terminates a short distance from said second end of said detection coil.

3. The apparatus according to claim 1 wherein said pair of solenoid coils are connected in an electric bridge circuit to act as two arms thereof.

* * * * *